United States Patent
Shih et al.

(10) Patent No.: US 8,013,926 B2
(45) Date of Patent: Sep. 6, 2011

(54) DIGITAL PHOTO FRAME AND METHOD FOR CONTROLLING SAME

(75) Inventors: Chu-Jung Shih, Miao-Li (TW); Shun-Ming Huang, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 407 days.

(21) Appl. No.: 12/228,024

(22) Filed: Aug. 8, 2008

(65) Prior Publication Data

US 2009/0040356 A1    Feb. 12, 2009

(30) Foreign Application Priority Data

Aug. 8, 2007   (CN) .......................... 2007 1 0075635

(51) Int. Cl.
*H04N 5/222* (2006.01)
(52) U.S. Cl. ................................................. 348/333.07
(58) Field of Classification Search .............. 348/333.07
See application file for complete search history.

(56) References Cited

U.S. PATENT DOCUMENTS

| | | | |
|---|---|---|---|
| 7,076,088 B2 * | 7/2006 | Pavlidis | 382/118 |
| 7,395,088 B2 * | 7/2008 | Shinzaki | 455/556.1 |
| 2004/0234109 A1 * | 11/2004 | Lemelson et al. | 382/118 |
| 2005/0034147 A1 * | 2/2005 | Best et al. | 725/10 |
| 2007/0150916 A1 * | 6/2007 | Begole et al. | 725/10 |

FOREIGN PATENT DOCUMENTS

CN    2868039 Y    2/2007

* cited by examiner

*Primary Examiner* — James Hannett
(74) *Attorney, Agent, or Firm* — Altis Law Group, Inc.

(57) ABSTRACT

An exemplary digital photo frame includes an image memory configured for storing a display image, a display device configured for reading and displaying the display image, an infrared sensor configured for detecting infrared light, generating a first detecting signal when the infrared light is detected, generating a second detecting signal when the detected infrared light is no longer detectable, and a camera control circuit including a reference image therein. The camera control circuit generates an instant image and compares the instant image with the reference image when the first detecting signal is generated. The digital photo frame is configured to operate in a monitor mode or a display mode according to a comparing result when the infrared light is detected.

14 Claims, 3 Drawing Sheets

DIGITAL PHOTO FRAME AND METHOD FOR CONTROLLING SAME

FIELD OF THE INVENTION

The present invention relates to digital photo frames, and particularly to digital photo frames configured to save power, and a method for controlling digital photo frames.

GENERAL BACKGROUND

Digital cameras are in widespread use. Images captured by digital cameras are typically stored as electronic files. The electronic files can be stored and managed in computers or other display apparatuses. Digital photo frames are display apparatuses primarily used for displaying and appreciating digital images photographed by the digital camera users. Digital photo frames have many advantages over conventional paper albums, including having a large memory for storing the digital images, and ability to change digital images, background and music at any moment.

Referring to FIG. 4, a block diagram of a circuit layout of a typical digital photo frame is shown. The typical digital photo frame 10 includes a power circuit 11, an image processing circuit 12, an image memory 13, and a display screen 14. The image memory 13 is configured to store digital images to be displayed. The image processing circuit 12 is configured to read the digital images stored in the image memory 13 and adjust the color and size of the images.

The power circuit 11 outputs an operation voltage to the image processing circuit 12. The image processing circuit 12 reads the images from the image memory 13, adjusts the color and size of the images, and provides the adjusted images to the display screen 14. The adjusted images are displayed on the display screen 14.

The typical digital photo frame 10 further includes a power on/off button (not shown) for users to turn the typical digital photo frame 10 on or off. If users forget to turn the digital photo frame 10 off, the digital photo frame 10 may be display images without anybody to appreciate and wasting energy.

In addition, the typical digital photo frame 10 does not support a monitor function. Multi-functional digital photo frames are demanded to meet the growing needs of consumers.

It is desired to provide a new digital photo frame and a method for driving the digital photo frame to overcome the above-described deficiencies.

SUMMARY

In an exemplary embodiment, a digital photo frame includes an image memory, a display device, an infrared sensor, and camera control circuit. The image memory is configured to store a display image. The display device is configured to read and display the display image. The infrared sensor is configured to detect infrared light and generate a first detecting signal when the infrared light is detected and generate a second detecting signal when the detected infrared light is no longer detectable. The camera control circuit includes a reference image. The camera control circuit generates an instant image and compares the instant image with the reference image when the first detecting signal is generated. The digital photo frame is configured to operate in a monitor mode or a display mode according to a comparing result when the infrared light is detected.

Other novel features and advantages will become more apparent from the following detailed description when taken in conjunction with the accompanying drawings.

DETAILED DESCRIPTION OF PREFERRED EMBODIMENTS

Figure 1:
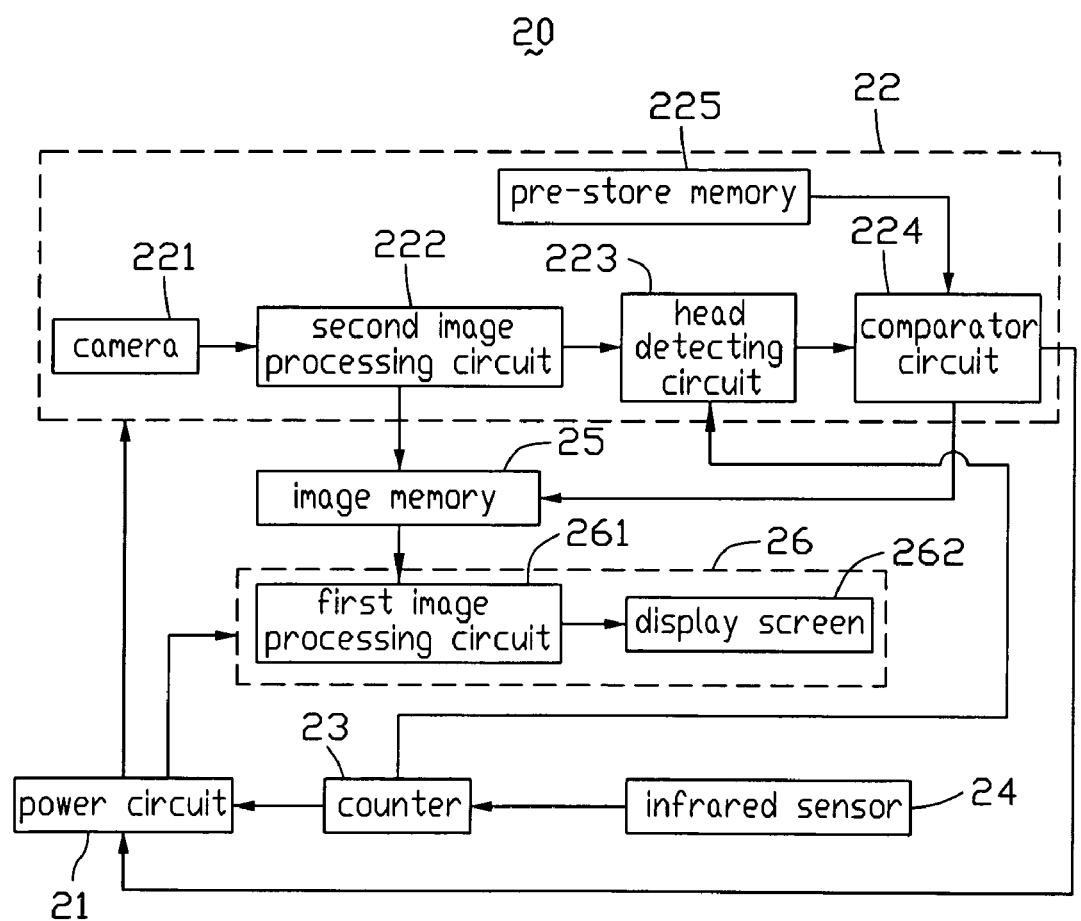
FIG. 1 is a block diagram of a first embodiment of a circuit layout of a digital photo frame.

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views. Reference will now be made to the drawings to describe various embodiments in detail.

Referring to FIG. 1, a block diagram of a first embodiment of a circuit layout of a digital photo frame 20 includes a power circuit 21, a camera control circuit 22, a counter 23, an infrared sensor 24, an image memory 25, and a display device 26.

The power circuit 21 is configured to provide operation voltages to the camera control circuit 22 and the display device 26. The infrared sensor 24 is configured to detect infrared light within a predetermined range, generate a detecting signal according to detection results, and provide the detecting signals to control an operation state of the counter 23.

A normal temperature of a human body is in a range from about 35° C. to 38° C. The human body radiates infrared light with wavelength in a range from about 9000 to 10000 nanometers. If the infrared sensor 24 detects infrared light having a wavelength in the range from about 9000 to 10000 nanometers, the infrared sensor 24 generates the first detecting signal and sends the first detecting signal to trigger the counter 23 to start to count. If the detected infrared light is no longer detectable, the infrared sensor 24 generates the second detecting signal and sends the second detecting signal to trigger the counter 23 to stop counting.

For exemplary purposes only, a time period for the counter 23 to count may be in a range from about 4 to 60 seconds. The counter 23 starts to count when the counter 23 receives the first detecting signal. When a counting result of the counter 23 reaches a predetermined number, the counter 23 generates a first control signal and sends the first control signal to the power circuit 21. The power circuit 21 provides an operation voltage to the camera control circuit 22 in response to the received first control signal. The counter 23 stops counting and generates a second control signal to shut off the power circuit 21 when the second detecting signal is generated and provided to the counter 23.

The image memory 25 is configured to store display images The image memory 25 is further configured to store instant images when the digital photo frame 20 works in a monitor mode.

The display device 26 includes a first image processing circuit 261 and a display screen 262. The first image processing circuit 261 is configured to read the display images stored in the image memory 25, adjust the color and size of the display images, and send the adjusted display images to the display screen 262.

The camera control circuit 22 includes a camera 221, a second image processing circuit 222, a head detecting circuit 223, a comparator circuit 224, and a pre-store memory 225. The camera 221 is configured to shoot instant images of an external object such as a human body. The second image processing circuit 222 receives the instant images from the camera 221, adjusts the color and size of the instant images, and sends the adjusted instant images to the head detecting circuit 223. The head detecting circuit 223 is configured to focus on the head parts of the instant images according to the outline or the color of the head parts, extract head images from the instant images, and provide the head images to the comparator circuit 224. The pre-store memory 225 is configured to pre-store one or more reference images and output the reference images to the comparator circuit 224. The reference image can be a head image of a human body or an animal, for example. The comparator circuit 224 is configured to compare and determine whether the head images are identical to the reference images, and generate a third control signal and a fourth control signal in response to a comparing result. The third control signal is provided to the image memory 25 and the fourth control signal is provided to the power circuit 21.

In an alternative embodiment, the counter 23 can generate a pulse signal and send the pulse signal to the head detecting circuit 223 to extract at least one head image from the instant images. The pulse signal is generated when the first control signal is provided to the power circuit 21.

Figure 2:
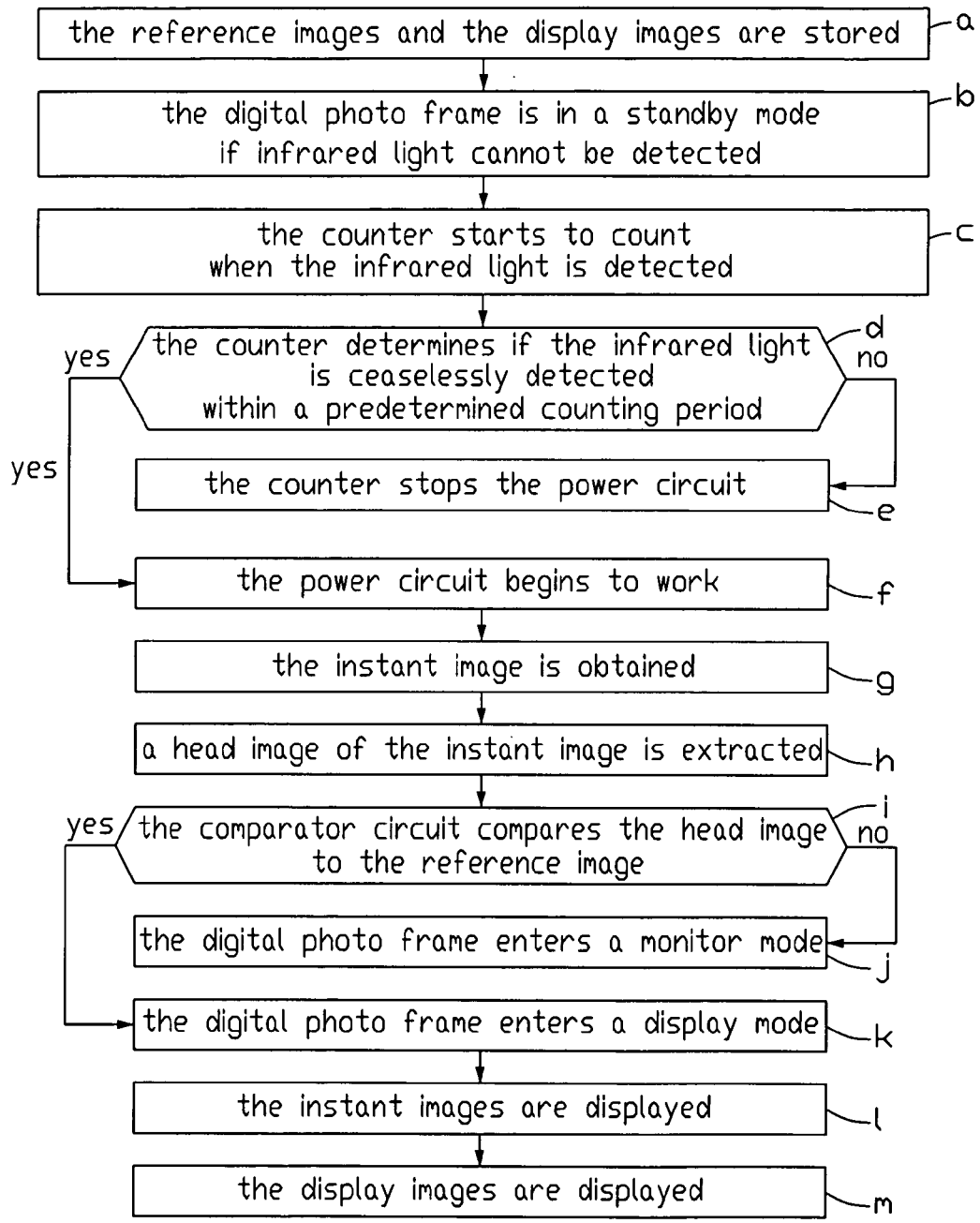
FIG. 2 is a flowchart summarizing a control method of the digital photo frame of FIG. 1.

Referring to FIG. 2, a flowchart summarizing a control method of the digital photo frame 20 is shown. Depending on the embodiment, certain of the steps described below may be removed, others may be added, and the sequence of the steps may be altered.

In a step (a), the reference images and the display images are stored. The pre-store memory 225 stores one or more reference images and the image memory 25 stores the display images.

In a step (b), the digital photo frame 20 is in a standby mode if infrared light cannot be detected. If the infrared sensor 24 does not detect infrared light radiating from a user when the digital photo frame 20 is turned on and initialized, the first detecting signal cannot be generated and provided to the counter 23. The counter 23, the power circuit 21, the display device 26, and the camera controlling circuit 22 are in the standby mode.

In a step (c), the counter 23 starts to count when infrared light is detected. The infrared sensor 24 generates the first detecting signal and sends the first detecting signal to the counter 23 when the infrared sensor 24 detects infrared light radiating from a user. The counter 23 begins to count according to the received first detecting signal.

In a decision step (d), the counter determines if the infrared light is ceaselessly detected within a predetermined counting period. The counter 23 keeps counting until the infrared sensor 24 no longer detects infrared light. If the infrared light cannot be detected, the method proceeds to a step (e). If the infrared light is still detectable within the predetermined counting period, the method proceeds to a step (f).

In a step (e), the counter stops the power circuit 21. If the detected infrared light is no longer detectable, the infrared sensor 24 generates the second detecting signal and sends the second detecting signal to the counter 23. The counter 23 stops counting and generates the second control signal in response to the received second detecting signal to shut off the power circuit 21. In a step (f), the power circuit begins to work. If the infrared light is still detected after a predetermined time period, the counter 23 generates the first control signal and sends the first control signal to the power circuit 21. The power circuit 21 provides the operation voltage to the camera control circuit 22 according to the received first control signal. Simultaneously, the counter 23 generates the pulse signal and sends the pulse signal to the head detecting circuit 223 to control an operation of the head detecting circuit 223.

In a step (g), the instant image is obtained. The camera 221 shoots and generates instant images and sends one or more instant images to the second image processing circuit 222. The second image processing circuit 222 adjusts the size and color of the instant images and sends the adjusted instant images to the image memory 25 and the head detecting circuit 223.

In a step (h), a head image of the instant image is extracted. The head detecting circuit 223 extracts one or more head image from one of the instant images and sends the head images to the comparator circuit 224. Simultaneously, the pre-store memory 225 sequentially outputs the reference images to the comparator circuit 224. In an alternative embodiment, the pre-store memory 225 can provide one of the reference images to the comparator circuit 224.

In a decision step (i), the comparator circuit 223 compares the head image to the reference image. If the head image is different from the reference image, the method proceeds to a step (j). If the head image is substantially similar to the reference image, the method proceeds to a step (k).

In a step (j), the digital photo frame 20 enters a monitor mode. If the head image is different from the reference image, the comparator circuit 224 generates the third control signal and sends the third control signal to enable the image memory 25. The instant images shot by the camera 221 may be sequentially stored in the image memory 25 via the second image processing circuit 222.

In a step (k), the digital photo frame 20 enters a display mode. If the head image is identical to the reference image, the comparator circuit 224 generates the fourth control signal and sends the fourth control signal to the power circuit 25 to power the display device.

In a step (l), the instant images shot by the camera 221 are displayed. If the monitor mode is already executed, the first image processing circuit 261 reads the instant images from the image memory and provides the instant images to the display screen 262. The instant images shot by the camera 221 when the digital photo frame 20 is in the monitor mode are displayed on the display screen 262.

In a step (m), the display images are displayed on the screen 262. The first image processing circuit 261 reads the display images from the image memory, adjusts the color and size of the display images, and provides the adjusted display images to the display screen 262. The adjusted display images are displayed on the display screen 262.

Power consumption of the digital photo frame 20 is minimized because the digital photo frame 20 works in the standby mode when no infrared light is be detected. In the standby mode, only the infrared sensor 24 is operational so power consumption of the digital photo frame 20 is very low. In addition, the digital photo frame 20 may automatically enter the monitor mode or display mode after comparing the instant image and the reference image because the digital photo frame 20 includes the pre-store memory 225 for storing the reference image.

Figure 3:
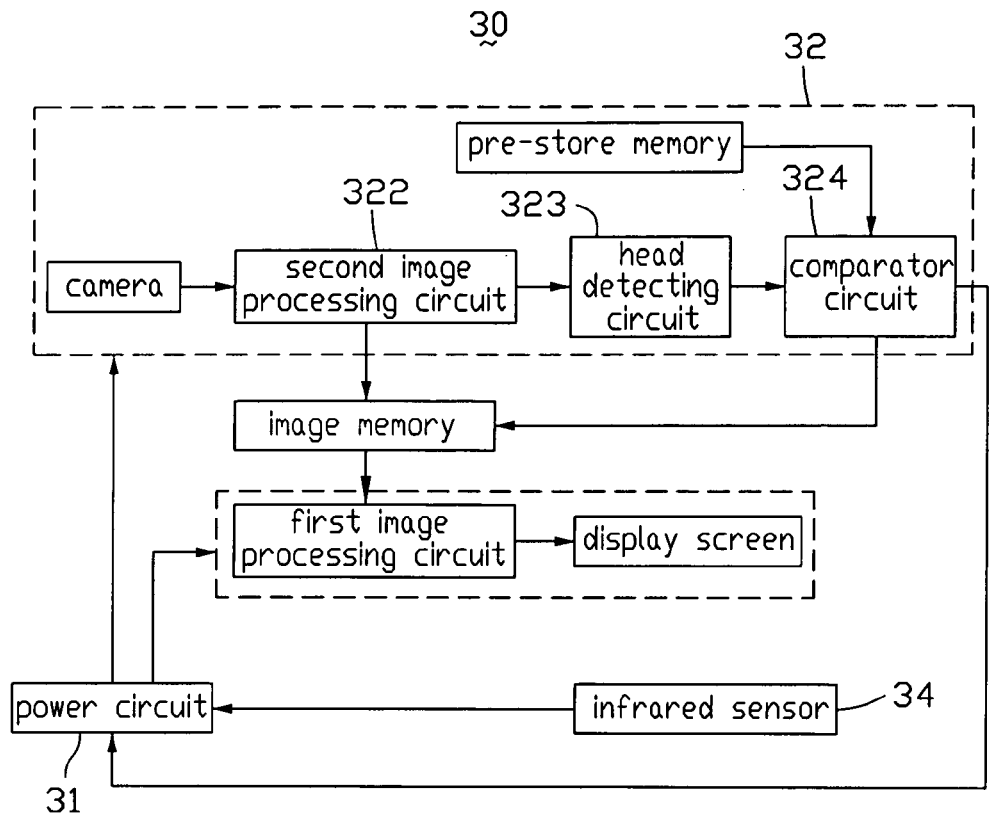
FIG. 3 is a block diagram of a second embodiment of a circuit layout of a digital photo frame.
Figure 4:
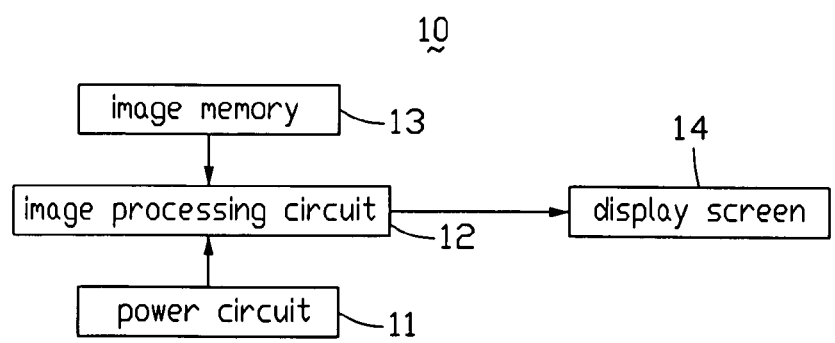
FIG. 4 is a block diagram of a typical digital photo frame.

Referring to FIG. 3, a block diagram of a second embodiment of a circuit layout of a digital photo frame 30 is similar to the digital photo frame 20 of FIG. 1 except that the counter 23 is omitted. The infrared sensor 34 generates a first detecting signal and sends the first detecting signal to the power circuit 31 when infrared light is detected. The power circuit 31 provides operation voltage to the camera control circuit 32 according to the received first detecting signal. If the detected infrared light is no longer detectable, the infrared sensor 34 generates a second detecting signal and sends the second detecting signal to shut off the power circuit 31. If the infrared sensor 34 does not detect infrared light radiating from a user, the first detecting signal and the second detecting signal cannot be generated. In this embodiment, the operation of the head detecting circuit 323 is controlled by software. The head detecting circuit 323 extracts at least one head image from the second image processing circuit 322 and provides the head image to the comparator circuit 324.

It is to be understood that even though numerous characteristics and advantages of the embodiments have been set out in the foregoing description, together with details of the structures and functions of the embodiments, the disclosure is illustrative only. Changes may be made in detail, especially in matters of arrangement of parts within the principles of present embodiments to the full extent indicated by the broad general meaning of the terms in which the appended claims are expressed.

What is claimed is:

1. A digital photo frame comprising;
    an image memory configured for storing a display image;
    a display device configured for reading and displaying the display image;
    an infrared sensor configured for detecting infrared light, generating a first detecting signal when the infrared light is detected, and generating a second detecting signal when the detected infrared light is no longer detectable; and
    a camera control circuit comprising a reference image therein,
    wherein the digital photo frame is in a standby mode when no detecting signals are generated by the infrared sensor; the camera control circuit generates an instant image and compares the instant image with the reference image when the first detecting signal is generated; and the digital photo frame is configured to switch to operating in a monitor mode or a display mode from the standby mode according to the comparing result when the infrared light is detected.

2. The digital photo frame of claim 1, further comprising a power circuit configured for providing operation voltages to the display device and the camera control circuit, wherein the infrared light is in a range from 9000 to 10000 nanometers.

3. The digital photo frame of claim 2, wherein the display device comprises a display screen and a first image processing circuit configured to read the images from the image memory, adjust at least one of the color and size of the images, and send the adjusted images to the display screen.

4. The digital photo frame of claim 3, wherein the camera control circuit comprises a camera configured to shoot the instant image; and the reference image is a head image of a user.

5. The digital photo frame of claim 4, wherein the camera control circuit further comprises a second image processing circuit configured to adjust the instant image, a head detecting circuit configured to extract a head image from the instant image, and a comparator circuit configured to determine whether the head image of the instant image is identical to the reference image.

6. The digital photo frame of claim 5, further comprising a counter configured to receive the first detecting signal or the second detecting signal from the infrared sensor and operate according to the first and second detecting signals.

7. The digital photo frame of claim 6, wherein the digital photo frame is in the monitor mode when the first detecting signal is generated and the head image of the instant image is not identical to the reference image.

8. The digital photo frame of claim 6, wherein the digital photo frame is in the display mode when the first detecting signal is generated and the head image of the instant image is identical to the reference image.

9. The digital photo frame of claim 6, wherein the counter is configured to generate a first control signal when the first detecting signal is received, and send the first control signal to start the power circuit.

10. The digital photo frame of claim 9, wherein the counter is further configured to generate a pulse signal and send the pulse signal to the head detecting circuit.

11. The digital photo frame of claim 6, wherein the counter is configured to generate a second control signal when the second detecting signal is received, and send the second control signal to shut off the power circuit.

12. A method for controlling a digital photo frame, comprising:
    pre-storing a reference image;
    detecting infrared light to determine if a user is beside the digital photo frame;
    shooting an instant image of the user if the infrared light is detected;
    comparing the instant image with the reference image;
    the digital photo frame working in a standby mode, if no infrared light is detected; and
    the digital photo frame working in a monitor mode or a display mode, if infrared light is detected;
    wherein the digital photo frame is in the monitor mode when the instant image is different from the reference image;
    wherein the instant image is stored into a memory circuit when the digital photo frame is in the monitor mode; and
    wherein the instant image and the display image are displayed on a screen when the digital photo frame is in the display mode.

13. A digital photo frame comprising:
    an image memory configured for storing a display image;
    a display device configured for reading and displaying the display image, the display device comprising a display screen and a first image processing circuit configured to read the images from the image memory, adjust at least one of the color and size of the images, and send the adjusted images to the display screen;
    an infrared sensor configured for detecting infrared light which is in a range from 9000 to 10000 nanometers, generating a first detecting signal when the infrared light is detected, and generating a second detecting signal when the detected infrared light is no longer detectable;
    a camera control circuit comprising a reference image therein; and
    a power circuit configured for providing operation voltages to the display device and the camera control circuit;
    wherein the camera control circuit generates an instant image and compares the instant image with the reference image when the first detecting signal is generated; and the digital photo frame is configured to switch to operating in a monitor mode or a display mode according to the comparing result when the infrared light is detected.

14. The digital photo frame of claim 13, wherein the camera control circuit comprises a camera configured to shoot the instant image; and the reference image is a head image of a user.

* * * * *